United States Patent [19]  [11] 4,292,936
Morishita et al. [45] Oct. 6, 1981

[54] ALUMINUM BASED ALLOY PISTONS FOR INTERNAL COMBUSTION ENGINES

[75] Inventors: Tuyoshi Morishita; Kenji Miyake; Kouji Tobita, all of Hiroshima, Japan

[73] Assignee: Toyo Kogyo Co., Ltd., Hiroshima, Japan

[21] Appl. No.: 39,289

[22] Filed: May 15, 1979

[30] Foreign Application Priority Data

May 16, 1978 [JP] Japan .................................. 53-58367

[51] Int. Cl.³ .............................................. F02F 3/04
[52] U.S. Cl. ................................ 123/193 P; 123/668; 29/156.5 R
[58] Field of Search ........... 123/193 R, 193 P, 191 R, 123/191 A, 193 CP, 668, 669; 29/156.5 R

[56] References Cited

U.S. PATENT DOCUMENTS

| | | | |
|---|---|---|---|
| 2,978,284 | 4/1961 | Daub | 29/156.5 R |
| 3,508,531 | 4/1970 | Squinto et al. | 123/193 P |
| 3,533,329 | 10/1970 | Galli | 29/156.5 R |
| 3,735,746 | 5/1973 | Schieber | 123/193 P |
| 4,008,051 | 2/1977 | Cadle | 164/98 |

Primary Examiner—Craig R. Feinberg
Attorney, Agent, or Firm—Fleit & Jacobson

[57] ABSTRACT

A piston for internal combustion engines has piston ring grooves at least one of which is totally or partly defined by an embedded body of a Fe based sintered material containing Ni and Cu. The sintered material is of a density of 5.5 to 6.8 g/cm³.

9 Claims, 6 Drawing Figures

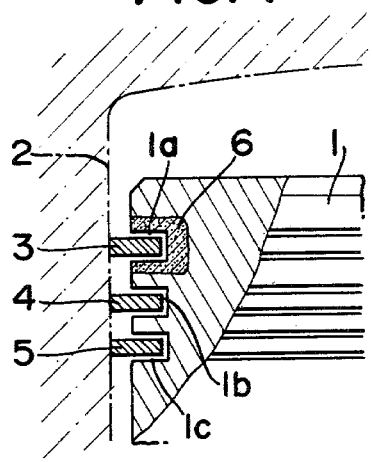
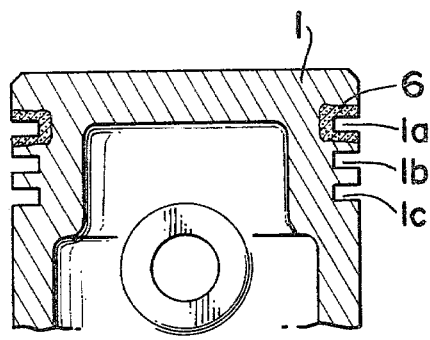
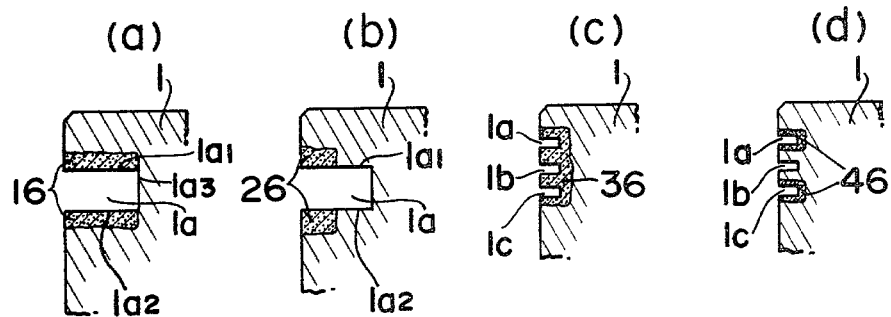
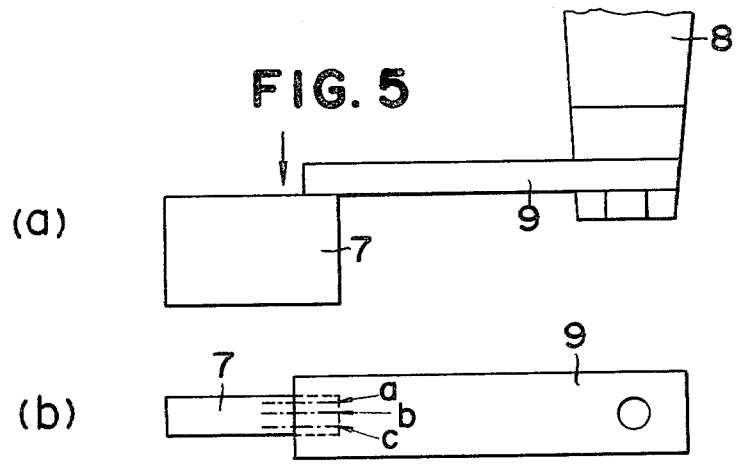

(×100)

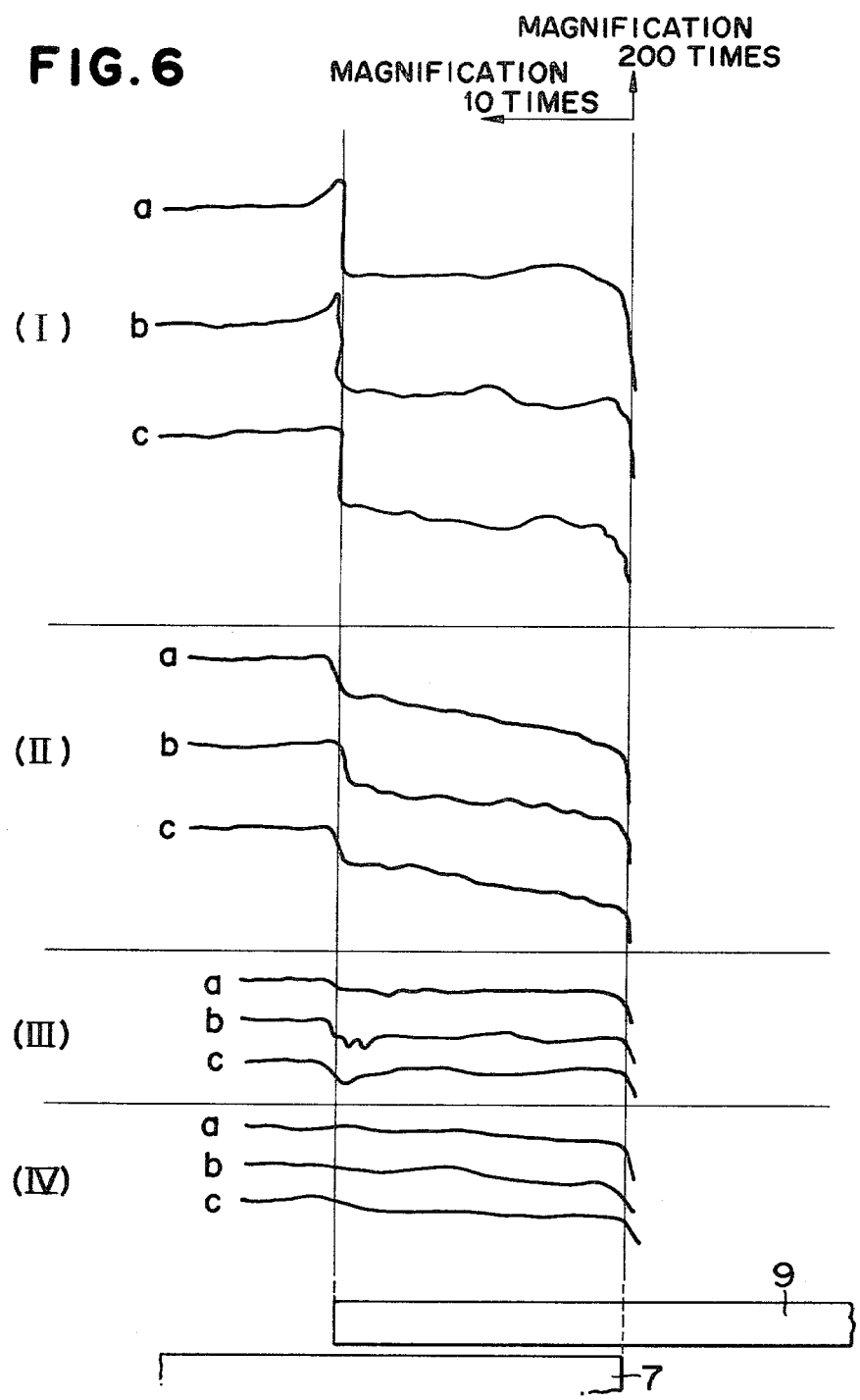

ALUMINUM BASED ALLOY PISTONS FOR INTERNAL COMBUSTION ENGINES

The present invention relates to pistons for internal combustion engines and more particularly to pistons made of aluminum based alloy. More specifically, the present invention pertains to aluminum based alloy pistons with embedded materials for defining piston ring grooves.

In internal combustion engines, particularly diesel cycle engines, it has been known to provide pistons with aluminum based alloy for the purpose of decreasing weight and facilitating heat radiation. However, inconveniencies have been encountered due to the fact that aluminum based alloy has an extremely low hardness under an increased temperature. Typically, an aluminum based alloy shows a hardness of approximately 140 in Vicker's scale under a normal or room temperature but the hardness is decreased as low as 20 to 30 in Vicker's scale under a temperature of 250° C. It has therefore been experienced in a piston made of an aluminum alloy that the piston ring grooves are deformed or smashed under repeated impacts which are applied from the piston rings during operation of the engine. Further, since approximately 40% of heat in the piston is transmitted through the piston rings to the cylinder, there has been a tendency that the temperature in the combustion chamber is excessively decreased where the piston is totally made of an aluminum based alloy which has a large coefficient of thermal conductivity.

In order to solve the above problems in aluminum based alloy pistons, it has been proposed to have embedded in the pistons insert bodies of comparatively low thermal conductivity and coefficient of thermal expansion similar to that of aluminum based alloy for defining piston ring grooves. It is expected that such insert bodies serve to restrict heat transfer from the pistons through the piston rings to the cylinders due to their low thermal conductivity. Further, the insert bodies are firmly fitted to the based metal of the pistons without any risk of being peeled-off even under an increased temperature since the coefficient of thermal expansion is close to that of the piston base metal.

Hithertofore, such insert bodies have been provided by a Ni-resist alloy which contains in weight less than 3% of C, 1.0 to 2.8% of Si, 0.8 to 1.5% of Mn, 13 to 22% of Ni, less than 8% of Cu, 1.5 to 3.5% of Cr and the balance of Fe. However, since the insert bodies are formed by casting the Ni-resist alloy, it has been difficult to ensure a high yield so that the expensive alloy is to some extent consumed uselessly. Further, it has also been difficult to have a strong adhesion of the Ni-resist alloy to the aluminum based alloy. Further disadvantages are that the Ni-resist alloy has a comparatively high density and a thermal conductivity.

In the U.S. Pat. No. 4,008,051 issued to Terence M. Cadle, there is taught to provide such insert bodies by a sintered austenitic ferrous alloy containing chromium and nickel and infiltrated with copper or copper-base alloy. It is understood that in this type of insert body the copper or copper-base alloy is added to fill pores in the sintered body so that the density of the body is still substantial.

The present invention has an object to provide insert means which is adapted to be embedded in a piston of aluminum based alloy to define a piston ring groove and in which the aforementioned problems of prior art can be overcome.

Another object of the present invention is to provide sintered piston insert means which possesses a satisfactory hardness under a high operating temperature and a sufficiently small thermal conductivity as well as a coefficient of thermal expansion substantially comparative to that of an aluminum based alloy.

A further object of the present invention is to provide piston insert means which can be manufactured with a least amount of material loss.

According to the present invention, the above and other objects can be accomplished by a piston having a crown and a peripheral wall and made of an aluminum based alloy, said piston being formed at the peripheral wall with a plurality of piston ring grooves including a top ring groove which is located closest to the crown among the piston ring grooves, insert means being casted in the piston to define at least partly at least said top ring groove, said insert means being made of a sintered material containing in weight 8 to 25% of Ni, 3.5 to 10% of Cu and the balance substantially of Fe and having a density of 5.5 to 6.8 g/cm$^3$. Since all elements in the insert means are sintered to form a compacted body, the insert means in accordance with the present invention can be of a sufficiently small density and the thermal conductivity can accordingly be decreased.

The above and other objects and features of the present invention will become apparent from the following descriptions of preferred embodiments taking reference to the accompanying drawings, in which:

FIG. 1 is a fragmentary sectional view of an internal combustion engine having a piston in accordance with one embodiment of the present invention;

FIG. 2 is a sectional view of the piston used in the engine of FIG. 1;

Figure 4:
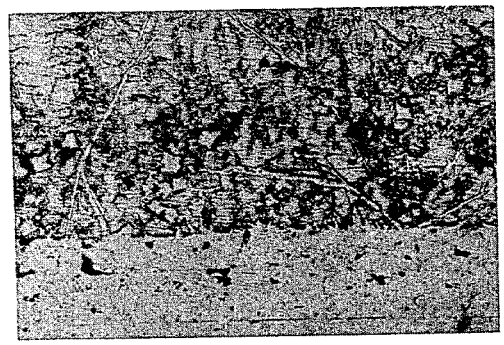

FIGS. 3(a), (b), (c) and (d) show modifications of the piston;

FIG. 4 is a microscopic photograph in 100 magnification showing the structure of the sintered insert body in accordance with one embodiment of the present invention;

FIGS. 5(a) and 5(b) are diagrammatical views of the device for testing the distortion resistant property of the sintered material; and FIG. 6 is a diagram showing the distortion resistant property.

Referring now to the drawings, FIG. 1 shows a diesel cycle engine having a piston 1 and a cylinder 2. The piston 1 has a crown and a peripheral wall, the latter being formed with a top ring groove 1a, a second ring groove 1b and an oil ring groove 1c. The top ring groove 1a is located closest to the piston crown among the grooves and receives a gas seal ring 3. The second ring groove 1b and the oil ring groove 1c are adapted to receive a gas seal ring 4 and an oil seal ring 5, respectively.

The piston 1 is made of an aluminum based alloy and the top ring groove 1a is defined by an insert body 6 of a sintered material. In the embodiment shown in FIGS. 1 and 2, the insert body provides all wall surfaces of the top ring groove 1a. Alternatively, as shown in FIG. 3(a), insert bodies 16 of a sintered material may be located so as to provide upper and lower wall surfaces $1a_1$ and $1a_2$ of the top ring groove 1a with the bottom wall surface $1a_3$ of the groove being defined by the base metal of the piston. FIG. 3(b) shows another modification in which the upper and lower wall surfaces $1a_1$ and $1a_2$ of the groove $1a$ are only partly provided by insert bodies 26 of a sintered material. In the arrangement shown in FIG. 3(c), an insert body 36 of a sintered material defines all of the ring grooves $1a$, $1b$ and $1c$. In FIG. 3(d), there is shown an arrangement wherein the top ring groove $1a$ and the oil ring groove $1c$ are defined by insert bodies 46 of a sintered material.

According to the present invention, the insert body is made of metal or alloy particles containing in weight 8 to 25% of Ni, 3.5 to 10% of Cu, less than 2.0% of C and the balance essentially of Fe added with 0.5 to 1.5% in weight of a suitable lubricant such as zinc stearate and compacted under pressure, and thereafter heated in a protective atmosphere of 1100° C. to 1250° C. to effect sintering. The sintered alloy thus formed must have a density of 5.5 to 6.8 g/cm³ in accordance with the present invention and an appropriate value of density is determined taking reference to the operating condition. The density of the sintered body can appropriately be increased within the above range by applying a coining operation to the sintered body.

In an iron-based material, it has been well known that an austenitic structure has a coefficient of thermal expansion which is close to that of aluminum and it is required to have Ni, Mn, Cr and Cu added solely or in combination to Fe in order to produce an austenitic structure under a normal temperature. However, since Mn has an adverse effect on the cutting property, it is omitted from the additives. It is recommendable to add less than 0.3% in weight of S in order to improve the cutting property. Cr and Si may be contained as far as they are less than 2% in weight, respectively.

Ni is required to produce an austenitic structure in the sintered body and provide an increased coefficient of thermal expansion. In order to prevent removal of the insert body from the base material during the engine operation due to a difference in thermal expansion, the coefficient of thermal expansion of the insert body must be greater than $17 \times 10^{-6}$ cm/°C.cm in view of the fact that aluminum based alloy has a coefficient of 20 to $23 \times 10^{-6}$ cm/°C.cm. Further, the coefficient must be less than $23 \times 10^{-6}$ cm/°C.cm because a higher coefficient has an adverse effect on the distortion resistant property. With the Ni content less than 8%, the coefficient of thermal expansion becomes less than the lower limit but the effect of Ni is saturated at about 25% and further addition of Ni is undesirable in economical point of view. Most recommendably, the Ni content should be 8 to 17% in weight.

Cu has a similar effect as the Ni content has and is further effective in preventing or decreasing distortion under a high temperature. The Cu content must be 3.5 to 10% in weight because under 3.5% an adequate improvement cannot be accomplished and over 10% no further improvement will be obtained. A recommendable or preferable range is between 4.5 and 7.5%.

It is recommendable that the total amount of Ni and Cu be not less than 15%. With the content less than 15%, the thermal expansion coefficient becomes less than $17 \times 10^{-6}$ cm/°C.cm and there may be a risk that the insert body is removed from the base metal during the engine operation due to a difference in thermal expansion.

Carbon is effective in improving the distortion resistant property under a high temperature as far as the content is less than 2.0% and the preferable range is 0.5 to 1.5%. However, in some cases, it may not necessarily be added.

The density range of 5.5 to 6.8 g/cm³ is important in that a satisfactory distortion resistance cannot be obtained with the density less than 5.5 g/cm³. With the density greater than 6.8 g/cm³, there will be a decrease in the engine performance.

The insert body as used in accordance with the present invention is produced by sintering metal or alloy particles of the aforementioned composition. It is preferable to use alloy particles because such use of alloy particles makes it easier to produce a satisfactory austenitic structure having a thermal expansion coefficient close to that of aluminum alloy.

The insert body or bodies of the sintered alloy is then embedded in the body of the piston by casting the aluminum alloy around the insert body and then appropriate ring groove or grooves are formed so that at least a part of the ring grooves is defined by the insert body. Before the aluminum alloy is casted, the insert body may be cleaned and dipped into a bath of molten aluminum for 3 to 7 minutes to perform a so-called Al-Fin treatment in order to ensure a better adhesion of the insert body to the piston base metal.

EXAMPLE 1

Particles are prepared from an alloy containing in weight 13% of Ni, 6% of Cu, 1% of C and the balance of Fe and added with 0.7% of zinc stearite. After mixing the particles with the zinc stearite, they are compacted under a pressure of 4 t/cm². The compacted body is then treated in an atmosphere of protective gas which is comprised of $H_2$ under a temperature of 1150° C. for 30 minutes and then cooled down. The sintered body thus formed had a density of 5.9 g/cm³, hardness of 150 to 170 in Vicker's scale, thermal expansion coefficient of $21.4 \times 10^{-6}$ cm/°C.cm and thermal conductivity of 0.012 to 0.025 cal/°C.S.cm.

The sintered body is then subjected to deoxidization and dipped in a bath of molten aluminum of 760° C. for 3 minutes. Thereafter, aluminum alloy is casted around the sintered body. FIG. 4 shows in microscopic photograph of 100 times magnification a section of the casted body. In FIG. 4, the whitish layer is the sintered alloy while the other layer the aluminum alloy.

The insert body of the sintered alloy in accordance with the present invention is compared in Table 1 with aluminum alloy which is normally used in the body of a piston and also with a casted Ni-Resist alloy which has been used for providing conventional insert bodies.

TABLE 1

|  | Al Alloy | Ni-Resist. | Invention |
|---|---|---|---|
| Coeff. of Thermal Expansion cm/°C.cm | $21.7 \times 10^{-6}$ | $19.8 \times 10^{-6}$ | $21.4 \times 10^{-6}$ |
| Thermal Conductivity cal/°C.S.cm. | 0.28 to 0.38 | 0.056 to 0.072 | 0.012 to 0.025 |
| Density g/cm³ |  | 7.3 | 5.5 |

In the Table 1, it will be apparent that the sintered alloy in accordance with the present invention has a coefficient of thermal expansion which is greater than that of the casted Ni-Resist alloy and substantially the same as that of aluminum alloy. It will therefore be understood that the insert body in accordance with the present invention has essentially no risk of being removed from the body of piston due to a difference in thermal expansion. Further, the thermal conductivity of the sintered alloy in accordance with the present invention is substantially smaller than that of the aluminum alloy and also smaller than that of the casted Ni-Resist alloy. Therefore, it is possible to suppress heat dissipation from the engine combustion chamber. The lower density of the sintered alloy has an effect of improving the engine performance.

With respect to the distortion resistant property, tests have been conducted with the device shown in FIG. 5. Referring to FIG. 5, it will be noted that a testpiece 7 is placed against one end of a hammer 9 which is connected at the other end with a supersonic vibrator 8 so that the hammer 9 beats the testpiece 7. The testpiece 7 is 20 mm wide, 40 mm long and 5 mm thick and located with respect to the hammer 8 so that the former is beaten at an area 5 mm from the tip end thereof. The hammer is 3 mm wide, 60 mm long and 20 mm thick.

The vibrator is energized with a power source of 22.3 KHz in frequency and a current of 200 to 240 mA to produce repeated movements of the hammer of approximately 150 microns in amplitude. The beating force is 1 to 1.5 kg and dry lubricant is used between the hammer and the testpiece. The test time is 3 hours for each testpiece.

Tests have been conducted with a testpiece I which is made of aluminum alloy, a testpiece II which is made of casted Ni-Resist alloy, a testpiece III which is made of the sintered alloy in accordance with the Example 1 and a further testpiece IV which is made of the sintered alloy in accordance with the Example 1 and applied with a coining treatment under 5 ton/cm². The results are shown in FIG. 6 in which the reference characters a, b and c show a side portion, the central portion and the other side portion of the testpiece, respectively and each curve designates the distortion of the testpiece. In FIG. 6, it will be noted that the testpiece III and IV which have been made of the sintered alloy in accordance with the present invention shown distortion which is significantly small in relation to that of the other testpieces and approximately one-thirds of the testpiece I which is made of aluminum alloy. There is no noticeable difference between the testpieces III and IV so that the coining process may be omitted.

EXAMPLE 2

Particles of metals are mixed to provide a mixture containing in weight 15% of Ni, 7% of Cu and the balance essentially of Fe. The mixture is then added with 7% in weight of zinc stearite as a lubricant and thereafter compacted under a pressure of 4 ton/cm² to form a compacted body which is then heated to 1150° C. for 30 minutes in a protective atmosphere of $H_2$. Then, the body is cooled down in room.

It has been found that the sintered material thus obtained is inferior to that of the Example 1 and has thermal conductivity, coefficient of thermal expansion and distortion resistant property which are between those of the Example 1 and those of the conventional casted Ni-Resist alloy.

The invention has thus been shown and described with reference to specific examples, however, it should be noted that the invention is in no way limited to the details of the described examples but changes and modifications may be made without departing from the scope of the appended claims.

We claim:

1. A piston for internal combustion engines including a crown and peripheral wall, said piston being formed at the peripheral wall with a plurality of piston ring grooves including a top ring groove which is located closest to the crown among the piston ring grooves, insert means being casted in the piston to define at least partly at least said top ring groove, said insert means being made of a sintered particulate homogeneous alloy comprising in weight 8 to 25% of Ni, 4.5 to 7.5% of Cu, less than 2% of C and the balance substantially of Fe and having a density of 5.5 to 6.8 g/cm³ and a coefficient of thermal expansion of 17 to $23 \times 10^{-6}$ cm/°c.cm, and total amount of Ni and Cu being not less than 15% in weight.

2. A piston for internal combustion engines including a crown and a peripheral wall, said piston being formed at the peripheral wall with a plurality of piston ring grooves including a top ring groove which is located closest to the crown among the piston ring grooves, insert means being casted in the piston to define at least partly at least said top ring groove, said insert means being made of a sintered particulate homogeneous alloy comprising in weight 8 to 25% of Ni, 3.5 to 7.5% of Cu and the balance substantially of Fe and having a density of 5.5 to 6.8 g/cm³.

3. A piston in accordance with claim 2 in which said insert means contains less than 2% in weight of C.

4. A piston in accordance with claim 2 in which said insert means has a coefficient of thermal expansion of 17 to $23 \times 10^{-6}$ cm/°C.cm.

5. The piston of claim 2, wherein said particulate homogeneous alloy consists of by weight 8 to 25% of Ni, 3.5 to 7.5% Cu, less than 0.3% S, less than 2.0% Cr, less than 2% Si, less than 2% C, and the balance Fe.

6. A piston in accordance with claim 2 or 5 in which total amount of Ni and Cu is not less than 15% in weight.

7. A piston in accordance with claim 2 or 5 in which said sintered material is applied with a coining process after sintering.

8. The piston of claim 2 or 5, wherein the Cu content is the particulate between about 4.5 to 7.5% by weight.

9. The piston of claim 2 or 5, wherein the total amount of Ni and Cu is not less than 15% in weight and wherein said insert has a coefficient of thermal expansion of 17 to $23 \times 10^6$ cm/°c.cm.

* * * * *